United States Patent
Goia et al.

(10) Patent No.: US 8,273,504 B2
(45) Date of Patent: Sep. 25, 2012

(54) METHOD FOR MANUFACTURE OF NOBLE METAL ALLOY CATALYSTS AND CATALYSTS PREPARED THEREWITH

(75) Inventors: Dan V. Goia, Potsdam, NY (US); Marco Lopez, Frankfurt (DE); Tapan Kumar Sau, Chandigarh (IN); Mihaela-Ortansa Jitianu, Potsdam, NY (US)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 13/223,750

(22) Filed: Sep. 1, 2011

(65) Prior Publication Data

US 2012/0058888 A1 Mar. 8, 2012

Related U.S. Application Data

(60) Continuation of application No. 12/752,410, filed on Apr. 1, 2010, now Pat. No. 8,017,548, which is a division of application No. 10/977,579, filed on Oct. 29, 2004, now Pat. No. 7,713,910.

(51) Int. Cl.
| | |
|---|---|
| B01J 23/00 | (2006.01) |
| B01J 23/40 | (2006.01) |
| B01J 23/42 | (2006.01) |
| B01J 23/44 | (2006.01) |
| B01J 21/18 | (2006.01) |
| H01M 4/02 | (2006.01) |
| H01M 4/36 | (2006.01) |
| H01M 4/90 | (2006.01) |
| H01M 4/92 | (2006.01) |
| H01M 4/94 | (2006.01) |

(52) U.S. Cl. ........ 429/524; 429/525; 429/527; 502/184; 502/185; 502/260; 502/261; 502/262; 502/326; 502/327; 502/330; 502/332; 502/333; 502/334; 502/339; 502/344

(58) Field of Classification Search ............ 502/184, 502/185, 260, 261, 262, 326, 327, 330, 332, 502/333, 334, 339, 34.4; 429/524, 525, 527
See application file for complete search history.

(56) References Cited

U.S. PATENT DOCUMENTS

| | | | | |
|---|---|---|---|---|
| 3,663,181 A * | 5/1972 | Shannon | ........... | 423/593.1 |
| 3,901,827 A * | 8/1975 | Sinfelt et al. | ........... | 502/245 |
| 4,677,092 A * | 6/1987 | Luczak et al. | ........... | 502/185 |
| 4,794,054 A * | 12/1988 | Ito et al. | ........... | 429/524 |
| 4,970,128 A * | 11/1990 | Itoh et al. | ........... | 429/498 |
| 5,024,905 A * | 6/1991 | Itoh et al. | ........... | 429/524 |
| 5,208,207 A * | 5/1993 | Stonehart et al. | ........... | 502/339 |
| 5,759,944 A * | 6/1998 | Buchanan et al. | ........... | 502/185 |
| 5,767,036 A * | 6/1998 | Freund et al. | ........... | 502/185 |
| 6,517,965 B1 * | 2/2003 | Gorer | ........... | 429/492 |
| 6,663,998 B2 * | 12/2003 | Nørskov et al. | ........... | 429/524 |
| 6,723,678 B2 * | 4/2004 | Gorer | ........... | 502/326 |
| 6,749,892 B2 * | 6/2004 | Chang | ........... | 427/115 |
| 6,861,387 B2 * | 3/2005 | Ruth et al. | ........... | 502/184 |
| 7,060,385 B2 * | 6/2006 | Kato et al. | ........... | 429/524 |
| 7,326,487 B2 * | 2/2008 | Chang | ........... | 429/483 |
| 2003/0104936 A1 * | 6/2003 | Mao et al. | ........... | 502/339 |
| 2003/0232235 A1 * | 12/2003 | Gorer et al. | ........... | 429/44 |
| 2004/0166396 A1 * | 8/2004 | Gorer | ........... | 429/40 |
| 2004/0175327 A1 * | 9/2004 | Hagemeyer et al. | ........... | 423/656 |
| 2005/0010070 A1 * | 1/2005 | Ryu | ........... | 585/259 |
| 2005/0106449 A1 * | 5/2005 | Fan et al. | ........... | 429/44 |
| 2005/0170222 A1 * | 8/2005 | Strasser et al. | ........... | 429/13 |

* cited by examiner

Primary Examiner — Cam N. Nguyen
(74) Attorney, Agent, or Firm — Levin Santalone LLP; John Santalone

(57) ABSTRACT

The invention provides a method for manufacturing supported noble metal based alloy catalysts with a high degree of alloying and a small crystallite size. The method involves using polyol solvents as reaction medium and comprises a two-step reduction process in the presence of a support material. In the first step, the first metal (transition metal; e.g. Co, Cr, Ru) is activated by increasing the reaction temperature to 80 to 160° C. In the second step, the second metal (noble metal; e.g. Pt, Pd, Au) is added and the slurry is heated to the boiling point of the polyol solvent in a range of 160 to 300 ° C. The catalysts manufactured according to the method are used as electrocatalysts for polymer electrolyte membrane fuel cells (PEMFC), direct-methanol fuel cells (DMFC) or as gas phase catalysts for CO oxidation or exhaust gas purification.

8 Claims, No Drawings

METHOD FOR MANUFACTURE OF NOBLE METAL ALLOY CATALYSTS AND CATALYSTS PREPARED THEREWITH

This application is a continuation application of U.S. patent application Ser. No. 12/752,410, filed Apr. 1, 2010, and a divisional application of U.S. patent application Ser. No. 10/977,579, filed Oct. 29, 2004, now U.S. Pat. No. 7,713,910, issued May 11, 2010; the disclosures of which are hereby incorporated by reference into the present disclosure.

BACKGROUND OF THE INVENTION

The present invention provides a method for manufacture of noble metal alloy catalysts. The method is based on the use of polyol solvents as reaction medium. The catalyst manufactured according to the invention are characterized by a high degree of alloying and a very small crystallite size. They can be used as electrocatalysts for polymer electrolyte membrane fuel cells (PEMFC), direct-methanol fuel cells (DMFC) or similar electrochemical devices. Furthermore, they are suitable as catalysts for CO-oxidation reactions (PROX) or exhaust gas purification.

In principle, fuel cells are gas-operated batteries, in which the chemical energy obtained from the reaction of hydrogen and oxygen is converted directly into electrical energy. The present invention describes catalysts for PEM fuel cells (PEM=polymer electrolyte membrane), which are suitable for operation with hydrogen-containing gases or with methanol (DMFC=direct methanol fuel cell). Fuel cells are gaining increased importance as mobile, stationary or portable power sources.

Electrocatalysts based on platinum (Pt) are routinely used on the anode and cathode side of PEM fuel cells. They comprise of finely divided noble metal particles, which are deposited on a conductive support material (generally carbon black or graphite). Normally, the concentration of noble metal is in the range from 10 to 90 wt. %, based on the total weight of the catalyst.

Conventional platinum anode catalysts are very sensitive to poisoning by carbon monoxide (CO). Therefore the concentration of carbon monoxide (CO) in the anode gas has to be reduced to the ppm-range in order to prevent performance losses in the fuel cells due to poisoning of the anode catalyst. It is known that the tolerance of a platinum catalyst to poisoning by carbon monoxide (CO) can be improved by alloying the platinum with ruthenium (Ru). Generally, this means that oxidation of the carbon monoxide adsorbed on the platinum to carbon dioxide ($CO_2$) takes place and the $CO_2$ is then readily desorbed.

For the cathode side of PEMFCs, frequently pure Pt/C catalysts are used. As some Pt alloy catalysts, comprising Pt and the base metals Co, Cr or Ni offer an activity enhancement by the factors of 1.5 to 3 (ref to U. A. Paulus, A. Wokaun et. al, *J. Phys. Chem. B*, 2002, 106, 4181-4191), these alloy compositions are more frequently used for cathode catalysts.

The present invention refers to the manufacture of nano-sized, noble metal catalysts via the colloid route. Various processes for manufacture of noble metal colloids in water-based systems are known:

EP 1 175 948 discloses noble-metal containing nanoparticles, which are embedded in an aqueous solution of a temporary stabilizer. The nanoparticles are manufactured by reduction of chloride-free precursor compounds in water in the presence of a polysaccharide. The nanoparticle materials are used for catalyst inks, catalyzed ionomer membranes and for the manufacture of electrocatalysts.

U.S. Pat. No. 5,925,463 describes metal, bi-metal and multi-metal colloids with particle sizes up to 30 nm. The colloids are stabilized by water-soluble stabilizers.

EP 423 627 B1 is directed towards the preparation of microcrystalline or amorphous metal or alloy colloids obtainable by reduction with metal hydrides in organic solvents.

EP 796 147 B1 and DE 44 43 705 disclose surfactant-stabilized colloids of mono- and bimetals of the groups VIIII and IB of the Periodic System of the Elements (PSE) having particle sizes in the range of 1 to 10 nm. They are prepared by reduction in water in the presence of strongly hydrophilic surfactants.

EP 924 784 B1 teaches alloyed PtRu/C catalysts with a medium particle size in the range of 0.5 to 2 nm. These alloy catalysts were prepared by fixing a PtRu colloid (obtained according to EP 423 627 B1) on a carbon black support at temperatures up to 50° C. The degree of alloying is relatively low, a lattice constant of 0.388 nm is reported.

More specifically, the present invention refers to a catalyst manufacturing process in polyol solvents as reaction medium (the "polyol process"). Similar processes have been recently published in the patent literature.

JP 11 246 901 provides a method for producing stable metal particles deposited on a porous carrier by dissolving a metal salt in a polyhydric alcohol ("polyol"). A pH-adjusting agent is added to adjust the pH value to prevent agglomeration of the particles.

U.S. Pat. No. 6,551,960 discloses the preparation of supported, nanosized catalyst particles, particularly PtRu particles, via a polyol process. A solution of platinum and ruthenium compounds in a polyhydroxylic alcohol solvent is mixed with an electrically conductive support material and subsequently heated to a temperature in the range of 20 to 300° C. to reduce the Pt and Ru to a zero valence state and to form PtRu catalyst particles with less than 1 micron particle size. The present inventors have reproduced this method. It was found that, due to the different reaction rates for the two elements in the process employed, the PtRu alloy formation is not complete (i.e. a low degree of alloying is obtained).

US 2003/0104936 A1 describes nanoparticle catalysts and a method of making them in a polyol process. A solution of metal chlorides of one or more catalyst metals in a polyalcohol solvent is converted to a colloidal particle suspension by raising the pH and heating, the solution. This colloidal suspension is then combined with the support material and the nanoparticles are deposited by lowering the pH of the suspension. A mixture of metal compounds is used and the metal compounds are simultaneously reduced.

U.S. Pat. No. 5,856,260 refers to the preparation of high activity catalysts. A solution of polyol is employed to impregnate and disperse a compound of a catalytic metal on an inorganic oxide support. Noble metal containing alloys are not disclosed.

SUMMARY OF THE INVENTION

It was an objective of the present invention to provide an improved method for manufacturing of noble metal based alloy catalysts in polyol solvents as reaction medium ("polyol process"). The catalysts prepared according to this method are supported on a carrier material, show a high degree of alloying and a small crystallite size of less than 3 nm.

It was a further objective of the invention, to provide a manufacturing process for noble metal based alloy catalysts, which avoids expensive and time-consuming heat treatment and/or calcination processes for alloy generation.

It was still a further objective of the invention, to provide a manufacturing process for noble metal based alloy catalysts, which avoids particle agglomeration, sintering and particle growth, commonly associated with heat treatment and/or calcination processes.

It was another objective of the invention, to provide Pt alloy catalysts, particularly PtRu and PtCo catalysts, with a high degree of alloying and a small crystallite size of less than 3 nm (as determined by XRD analysis).

These objectives were met by the method disclosed in the present invention. The method is based on a two-step, sequential reduction process. In the first step, the precursor compound of the first metal (M1; a base metal or a "less noble" metal such as ruthenium) is activated by adjusting the reaction temperature in a range of 80 to 160° C. In the second step, the precursor compound of a second and/or third metal (M2; the noble metal(s) such as platinum, palladium, gold or mixtures thereof) is added to the slurry. After a certain period of time, the temperature is further increased in a range of 160 to 300° C. Due to this two-step method a uniform reduction process occurs, leading to noble metal based particles with a high degree of alloying and a small crystallite size. In the presence of a suitable support material, the alloy particles are deposited on the support surface.

DETAILED DESCRIPTION OF THE INVENTION

Surprisingly, it has been found that the degree of alloying is substantially improved by the two-step method disclosed in the present invention. The first metal M1 (e.g. a base metal) is activated prior to the addition of the second metal (M2, a noble metal, preferably platinum). This activation is achieved by heating the polyol solution containing the first metal (M1) to a temperature in the range of 80 to 160° C.

As an example, the effect is explained in the Pt—Ru system. The thermal energy added to the system increases the reduction rate ($V_1$) for the reduction of the first metal (M1, in this case the $Ru^{3+}$ compound). At the point when the second metal (M2, the Pt compound) is added, the reduction rate ($V_2$) for the Pt compound and the reduction rate for the Ru compound ($V_1$) become nearly identical:

M1:

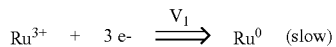

M2:

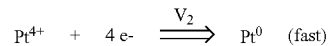

Condition for a high degree of alloying: $V_1 \sim V_2$

The same correlations apply to the two-step reduction process of base metals (M1=Co, Ni, Cu etc) in the presence of noble metals (M2=Pt, Pd or Au etc). As a result of the two-step method, catalysts comprising of particles with a high degree of alloying are obtained.

It should be noted, that for the second step the noble metal (M2) can comprise of a mixture or a combination of various noble metals, such as for example Pt+Au, Pt+Pd or Pt+Rh. Thus, ternary Pt-based alloy catalyst systems (e.g. PtCoAu, PtRuAu) can be manufactured. Typically, the ternary alloy catalysts comprise between 0.1 to 5 wt. % of a second noble metal (other than Pt) based on the total weight of the catalyst.

As the alloying step does not need any heat treatment, sintering effects are avoided. The alloy particles prepared by the present method are very small in size. Typically, the medium crystallite size is less than 3 nm (as detected by XRD analysis)

The X-ray diffraction ("XRD") analysis is performed on powdered catalyst samples with a powder diffractometer manufactured by STOE Co, Darmstadt/Germany using, Cu—K$\alpha$ radiation. The diffractograms are recorded in reflexion mode in the 2 $\theta$-range of 20 to 120°, the two peaks for face-centered Pt (1, 1, 1) and Pt (2, 0, 0) are monitored.

For the Pt-based alloy catalysts of the present invention, alloying, is observed by a shift of the Pt peaks towards higher values of $2\theta$. In addition to that, peaks associated to a non-alloyed component (for example free Co or free Ru) are not detected in the XRD spectra.

The degree of alloying is determined by the lattice constant of the Pt alloy particle. The lattice constant again is derived from XRD analysis. According to VEGARD's law, a lattice contraction occurs due to the alloying process. In the case of Pt, this results in a lower value of the lattice constant of the Pt-alloy catalyst compared to pure Pt. In general, the higher the degree of alloying, the lower is the lattice constant.

The lattice constant for pure Pt is 0.3923 nm (ref to ICDD data base; International Center for Diffraction Data, Campus Boulevard, Newton Square, Pa., USA). Due to the high degree of alloying, the noble metal based catalysts of the present invention have lattice constants, which are considerably lower than this value.

In the present invention, the term "alloy" means a solid solution of the first metal component (M1) in the fcc (face-centered cubic) lattice of the second metal component (M2). There are no ordered phases or intermetallic compounds present. Such ordered phases are obtained by employing high temperatures in the range of 600 to 900° C. in common heat treatment processes. Therefore, the corresponding signals for super-lattices (for example of the AB3-type) not detected in the XRD spectra.

The first metal (M1) is a base metal selected from the group of transition metals of the Periodic System of Elements (PSE). Examples are titanium, vanadium, chromium, manganese, iron, cobalt, nickel, copper, zinc, zirconium, niobium, molybdenum, tantalum, tungsten and rhenium. Furthermore, ruthenium, although a member of the group of noble metals, is part of this first group (M1) due to its "less noble" characteristics.

The second metal (M2) is a noble metal selected from the group of platinum, silver, palladium, rhodium, gold, iridium and mixtures or combinations thereof. Preferably, platinum and a combination of platinum and gold (PtAu) or platinum and palladium (PtPd) is used.

In a typical manufacturing process, the carbon support material (e.g. XC72R, Cabot Inc.) is suspended in the polyol, e.g. DEG (diethylene glycol) or PG (propylene glycol). Optionally, the polyol solvent may contain a protective colloid or stabilizer, such as arabic gum. Then the precursor compound of the first metal (M1) is added. The mixture is subsequently heated to 80 to 160° C. with constant stirring. In this stage, the precursor compound of M1 is activated. In the case of Ru, the precursor compound is partly reduced from $Ru^{3+}$ to $Ru^{2+}$ and a change in color is sometimes visible.

After having reached a certain temperature in the range of 80 to 160° C., the precursor compound of the second metal (M2, preferably Pt or a mixture of Pt with another noble metal) is added. When the addition is completed, the suspension is finally heated to the boiling point of the polyol solvent ($T_{bp}$) and maintained there for a minimum of 30 mins.

Optionally, the process may contain an additional step to destroy the protective colloid. After the final heating step, an acid is added while the suspension is maintained at temperatures in the range of 100 to 110° C. Alternatively, the protective colloid can be destroyed by addition of alkalis such as NaOH.

The suspension is cooled down to room temperature and the catalyst is separated, washed chloride-free and dried. For many fields of application, the catalyst may be used in this condition. For certain special applications, it may be advantageous to calcine the catalyst afterwards under an inert or reducing atmosphere at temperatures between 300 and 1000° C.

Suitable precursors for the first metal (M1) are chlorides, nitrates, carbonates, hydrogencarbonates, basic carbonates, sulfates, nitrites, acetates etc. of the transition metals. Examples are cobalt(II)-chloride, cobalt(II)-nitrate, cobalt(II)-hydroxide-carbonate, cobalt(II)-carbonate, copper(II)-acetate, chromium(III)-nitrate, manganese(II)-sulfate etc. Suitable precursors for Ru are ruthenium(III)-chloride, ruthenium acetate, ruthenium nitrosyl-nitrate and similar compounds.

Suitable precursors for the second metal (M2, noble metal) are for example bis-ethanolamine-hexahydroxo-platinate ["EA-platinum" or $(EA)_2Pt(OH)_6$]), hexachloro-platinum acid ("CPA" or $H_2PtCl_6$), platinum nitrate and other Pt precursor compounds. A suitable precursor for Au is for example gold(III)-chloride ($AuCl_3$), for Pd preferably palladium(II)-nitrate or palladium chloride is used.

Examples for suitable polyol solvents are 1,2-ethylene glycol (EG), diethylene glycol (DEG), 1,2-propylene glycol (PG), 1,3-propylene glycol, triethylene glycol, tetraethylene glycol, glycerol, hexylene glycol and similar solvents. The polyol solvent may contain some water, typically in the range of less than 20 wt. %.

Optionally, protective colloids, stabilizers and/or wetting agents may be used. Suitable protective colloids are polysaccharides such as alginates, arabic gum, gelatine, xanthane gum, gum traganth or cellulose. When using protective colloids, the metal concentration in the process can be increased while avoiding the problem of particle agglomeration. After completion of the reaction, the protective colloid can be destroyed by treating the suspension at temperatures in the range of 100 to 110° C. for 30 to 120 mins in an acidic (pH 0.2 to 2) or alkaline environment (pH 8 to 12).

As support materials, carbon blacks, graphitised carbon blacks, graphites, activated carbons, carbon nanoparticles, carbon nanotubes, or inorganic oxides with specific surface areas (BET surface areas measured according to DIN 66132) in the range of about 30 to 2000 $m^2/g$ are preferably used for the catalysts. Examples for suitable carbon black materials are Vulcan XC 72R (Cabot Inc.) or Ketjenblack EC 300 (Akzo-Nobel).

Examples for high surface area inorganic oxides are alumina, titanium dioxide (e.g. P25, Degussa, Duesseldorf) or silica (e.g. Aerosil 200, Degussa, Duesseldorf). If the catalyst is intended for use as electrocatalyst in fuel cells, a highly electrically conductive support material is chosen. If the catalyst is used for gas-phase reactions such as CO-oxidation (PROX) or for purification of exhaust gases (automotive catalysts), preferably high surface area alumina or mixed oxides, such as alumina/silica are employed.

Typically, the concentration of the alloy components M1 and M2 on the support material is in the range of 1 to 90 wt. %, preferably in the range of 10 to 80 wt. % based on the total weight of the catalyst.

In the case of M1=Ru and M2=Pt, the atomic ratio of Pt to Ru (M2/M1) in the catalyst is adjusted in a range between 4:1 to 1:4, preferably in a range of about 1:1. The concentration of platinum and ruthenium on the support material is in the range of 1 to 90 wt. %, preferably in the range of 10 to 80 wt. % based on the total weight of the catalyst.

The lattice constants of the supported PtRu(1:1)-catalysts manufactured according to the present invention are—due to the high degree of alloying—lower than 0.3850 nm, preferably lower than 0.3840 nm. These values apply also to the ternary PtRu(1:1)Au catalysts with a gold content of 0.1 to 5 wt. % based on the total weight of the catalyst.

The PtRu and PtRuAu alloy catalysts prepared according to the invention are characterized by a very good tolerance to poisoning by carbon monoxide (CO) and, furthermore, by an excellent performance as anode catalysts in DMFC. Furthermore, they are very well suited for CO oxidation processes (PROX) and for automotive applications. Due to the high degree of alloying, they do not contain any free Ru particles, which may be detrimental to the catalyst performance.

In the case of M1=base metal and M2=noble metal, the atomic ratio of the noble metal (preferably Pt) to the base metal (M2/M1) in the catalysts is adjusted in a range between 5:1 and 1:1, preferably in a range of about 3:1. Again, the concentration of the noble metal(s) and the base metal on the support material is in the range of 1 to 90 wt. %, preferably in the range of 10 to 80 wt. % based on the total weight of the catalyst. These ratios also apply also for ternary Pt alloys containing base metals, such as PtCoAu or PtCoPd, wherein the second noble metal (other than Pt) is present in an amount of 0.1 to 5 wt. % based on the total weight of catalyst.

The lattice constants for the $Pt_3Co$ catalysts manufactured according to the present invention are—due to the high degree of alloying—lower than 3,870 nm.

The base metal containing noble metal alloy catalysts prepared according to the present invention are excellent catalysts for fuel cell applications (e.g. cathode catalysts for PEMFC and DMFC). Generally, they show a higher activity in the cathodic oxygen reduction reaction (ORR) compared to their non-alloyed or incompletely alloyed counterparts.

The invention is explained in more detail in the following examples and the comparative example (CE1) without limiting its scope of protection.

EXAMPLES

Example 1

50 wt % PtRu/C Alloy Catalyst 12.0 g Ru(III)-chloride (aqueous solution with 20 wt. % Ru; Umicore, Hanau/Germany) were taken in 500 ml 1,2-propylene glycol (PG) in a reaction flask. After stirring for 30 min at 300 rpm, conc. NaOH solution was added to obtain the desired pH value of 5.5.

In the next step, 1.75 g arabic gum (Merck AG; Darmstadt/Germany, previously dissolved in 10 ml of water under mixing) were added to the above reaction mixture by rinsing the beaker with 50 ml polyol. After 30 min mixing, 7.0 g carbon black Vulcan XC 72R (Cabot Corp., Billerica, Mass./USA) was added to the mixture. After 1 hour of mixing, the content of the flask was heated up to 150° C.

After the mixture has adjusted to this temperature, the Pt precursor was added. 18.4 g chloroplatinic acid ($H_2PtCl_6$, aqueous solution with 25 wt. % Pt; Umicore, Hanau/Germany) dissolved in 100 ml 1,2-propylene glycol (PG) were slowly added into the flask with a dropping funnel. The temperature of the reaction mixture was then increased to the boiling temperature of PG ($T_{bp}$=188° C.). The final temperature was maintained for 30 min.

The slurry was then cooled to 150° C. Then 275 ml of cold DI water was added to bring the temperature to 100° C. At this point, conc. HCl solution was added to attain a pH value of 0.8 and the temperature was maintained between 100 and 110° C. for 120 mins in order to hydrolyze the arabic gum. Stirring was continued for additional 30 mins. When the system cooled to room temperature, the solids were allowed to settle down and the solvent was decanted.

The solid residue was washed with 500 ml of an 1:1 ethanol-water solution for 10 min and allowed to settle down. This step was repeated once and then once again washed with 500 ml DI water. Finally, the solid residue was filtered under vacuum and was transferred to a desiccator for drying.

Catalyst Characterisation:
  Composition: 50 wt. % PtRu on Vulcan XC72R
  Pt/Ru ratio: 1:1 (atomic ratio)
  Crystallite size 2.3 nm (by XRD)
  Lattice constant: 0.3824 nm (by XRD)
  Degree of alloying: high Comparative Example (CE 1)

For comparison, example 2 of U.S. Pat. No. 6,552,960 was reproduced. In variation to the description, a high surface area carbon black support (Black Pearls 2000) was used instead of activated carbon.

1.9 g of $RuCl_3 \times 3H_2O$ (35.8 wt. % Ru; Umicore, Hanau/Germany) were dissolved in 400 ml of 1,2-ethylene glycol (EG) for 30 mins. In parallel, 3.3 g of $H_2PtCl_6 \times H_2O$ (40 wt. % Pt, Umicore, Hanau/Germany) were dissolved in 400 ml of the same solvent.

2 g of carbon black (Black Pearls 2000; Cabot Corp., Billerica, Mass./USA) were suspended in 900 ml of 1,2-ethylene glycol for 30 mins.

The Ru- and the Pt-salt solution were mixed together and poured into the carbon black suspension. After further mixing for 30 mins, the suspension was heated to the boiling point of 1,2-ethylene glycol ($T_{bp}$=197° C.) and refluxed for 1 hour.

Then the suspension was filtered and the solid residue was washed with DI water and dried under vacuum overnight. As a result, a 50 wt. % PtRu catalyst was obtained.

Catalyst Characterisation:
  Composition: 50 wt. % PtRu on Black Pearls 2000
  Pt:Ru ratio: 1:1 (atomic ratio)
  Crystallite size: 7.1 nm (by XRD)
  Lattice constant: 0.3888 nm (by XRD)
  Degree of alloying: low (incomplete alloying)

Example 2

50 wt. % PtCo/C Alloy Catalyst 550 ml diethylene glycol (DEG) were introduced into a three-necked flask. 1.75 g of arabic gum (previously dissolved in 10 ml DI water for 1 hour) were transferred to the polyol using an additional 50 ml of DEG. The arabic gum/DEG mixture was mixed at 500 rpm for 30 minutes.

Then, 3.5 g carbon black (Vulcan XC72R, Cabot Inc.) were dispersed in the arabic gum/DEG solution and the dispersion was stirred for 1 more hour.

0.57 g Co(II)-hydroxide carbonate (56.1 wt. % Co; OMG, Cleveland, Ohio/USA) were added to the flask using 50 ml DEG. The mixture was stirred for 30 mins. Then the temperature of the flask was increased to 85° C.

At this temperature, 42.43 g of $(EA)_2Pt(OH)_6$ (aqueous solution, 7.47 wt. % Pt; Umicore, Hanau/Germany) were added to the flask, using 50 ml DEG, followed by 1 hour of stirring at 500 rpm. During stirring, the pH was adjusted at 6.0±0.1 with acetic acid.

The flask was heated at the boiling point of DEG ($T_{bp}$=246° C.) and kept at that temperature for 2 hours. After the reduction was complete, the reaction mixture was cooled down at room temperature and 300 ml DI water were added.

After settling of the catalyst particles, the top solution was siphoned off, and 300 ml DI water were added. After the solids have settled again, the top solution was further siphoned off; this procedure was repeated three times. The catalyst was then filtered and washed on the filter repeatedly with DI water until a colorless washing liquor was obtained.

Catalyst Characterisation:
  Composition: 50 wt. % PtCo on Vulcan XC72R
  Pt:Co ratio: 3:1 (atomic ratio)
  Crystallite size: 2.8 nm (by XRD)
  Lattice constant: 0.3867 nm (by XRD)
  Degree of alloying: high Example 3

PtRuAu/C Alloy Catalyst 550 ml 1,2-propylene glycol (PG) were introduced into a 1 l three-necked flask. 1.25 g of arabic gum (previously dissolved in 10 ml DI water) were transferred to the polyol using additional 50 ml of PG. The arabic gum/PG mixture was mixed at 500 rpm for 30 more minutes.

Then, 2.5 g of carbon black (Ketjenblack EC-300J, AKZO Nobel, Amersfoort/The Netherlands) were dispersed in the arabic gum/PG solution and the dispersion was stirred for 1 additional hour.

In the next step; 4.63 g Ru(III)-chloride (aqueous solution with 18.3 wt. % Ru, Umicore Hanau/Germany) were added to the flask using 50 ml PG, the stirring speed was changed to 350 rpm and the pH was adjusted to 5.5 with NaOH.

The flask was heated to 150° C., and then a mixture of 4.08 g CPA (Chloroplatinic acid, 39.66 wt. % Pt, Umicore, Hanau/Germany) and 0.107 g of $AuCl_3$ (aqueous solution with 23.15 wt. % Au; Umicore, Hanau/Germany) in 100 ml PG was prepared. After the pH was pre-adjusted to 5.5 with NaOH, the mixture was added to the flask.

The flask was heated to the boiling point of PG ($T_{bp}$=188° C.) and kept at that temperature for 30 mins. After the reduction was complete, the reaction mixture was cooled down to 100° C. and 100 ml DI water were added.

At this point, conc. HCl solution was added to attain a pH value of ~0.8 and the temperature was maintained between 100 and 110° C. for 2 hours in order to hydrolyse the arabic gum. The system was cooled to room temperature and 200 ml DI water were then added.

After settling of the catalyst, the top solution was siphoned off, and 300 ml DI water were added. After the solids have settled again, the top solution was further siphoned off; this procedure was repeated three times. The catalyst was then filtered and washed on the filter repeatedly with DI water until a colorless washing liquor was obtained.

Catalyst Characterisation:
  Composition: 50 wt. % PtRu+0.5 wt. % Au on Ketjenblack EC 300
  Pt:Ru ratio: 1:1 (atomic ratio)
  Crystallite size: <2 nm (by XRD)
  Lattice constant 0.3839 nm (by XRD)
  Degree of alloying: high

What is claimed is:

1. A supported ternary platinum-cobalt-gold alloy catalyst with the atomic ratio Pt:Co=3:1,
wherein the crystallite size is less than 3 nm and the lattice constant is lower than 0.3870 nm (by XRD),
and wherein gold (Au) is present in an amount of 0.1 to 5 wt.-% based on the total weight of the catalyst.

2. A supported ternary platinum-cobalt-gold alloy catalyst according to claim 1, wherein the concentration of platinum, cobalt and gold on the support is in the range of 1 to 90 wt.-% based on the total weight of the catalyst.

3. A supported ternary platinum-cobalt-gold alloy catalyst according to claim 2, wherein the concentration of platinum, cobalt and gold on the support is in the range of 20 to 80 wt.-% based on the total weight of the catalyst.

4. An electrochemical device which comprises the supported ternary platinum-cobalt-gold alloy catalyst of claim 1.

5. A supported ternary platinum-cobalt-palladium alloy catalyst with the atomic ratio Pt:Co=3:1,
wherein the crystallite size is less than 3 nm and the lattice constant is lower than 0.3870 nm (by XRD),
and wherein palladium (Pd) is present in an amount of 0.1 to 5 wt.-% based on the total weight of the catalyst.

6. A supported ternary platinum-cobalt-palladium alloy catalyst according to claim 5, wherein the concentration of platinum, cobalt and palladium on the support is in the range of 1 to 90 wt.-% based on the total weight of the catalyst.

7. A supported ternary platinum-cobalt-palladium alloy catalyst according to claim 6, wherein the concentration of platinum, cobalt and palladium on the support is in the range of 20 to 80 wt.-% based on the total weight of the catalyst.

8. An electrochemical device which comprises the supported ternary platinum-cobalt-palladium alloy catalyst of claim 5.

* * * * *